Feb. 20, 1968  R. L. HARLAN  3,369,332
CEILING SUSPENSION SYSTEM
Filed April 14, 1966  3 Sheets-Sheet 1

Robert L. Harlan
INVENTOR.
BY James W. Grace
ATTORNEY

Robert L. Harlan
INVENTOR.

BY James W. Grace
ATTORNEY

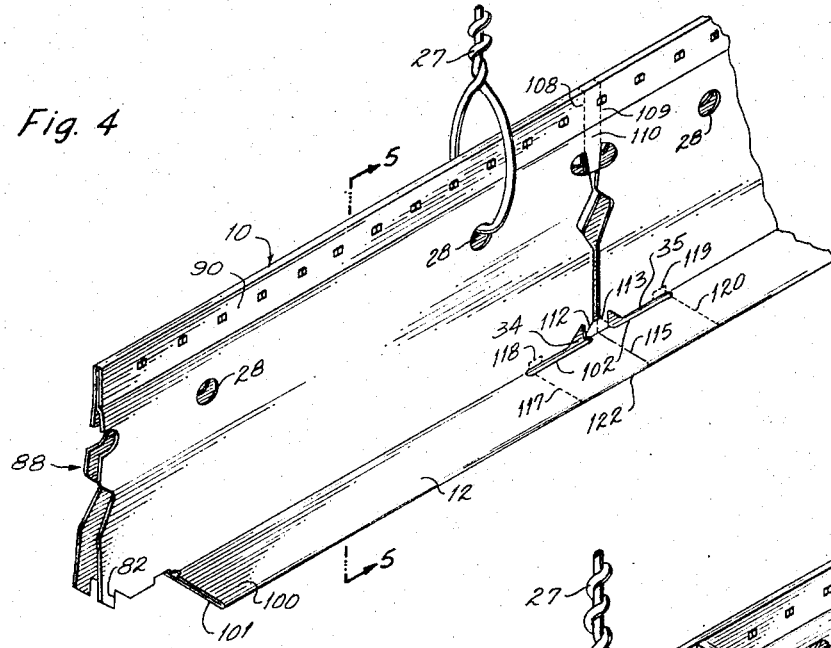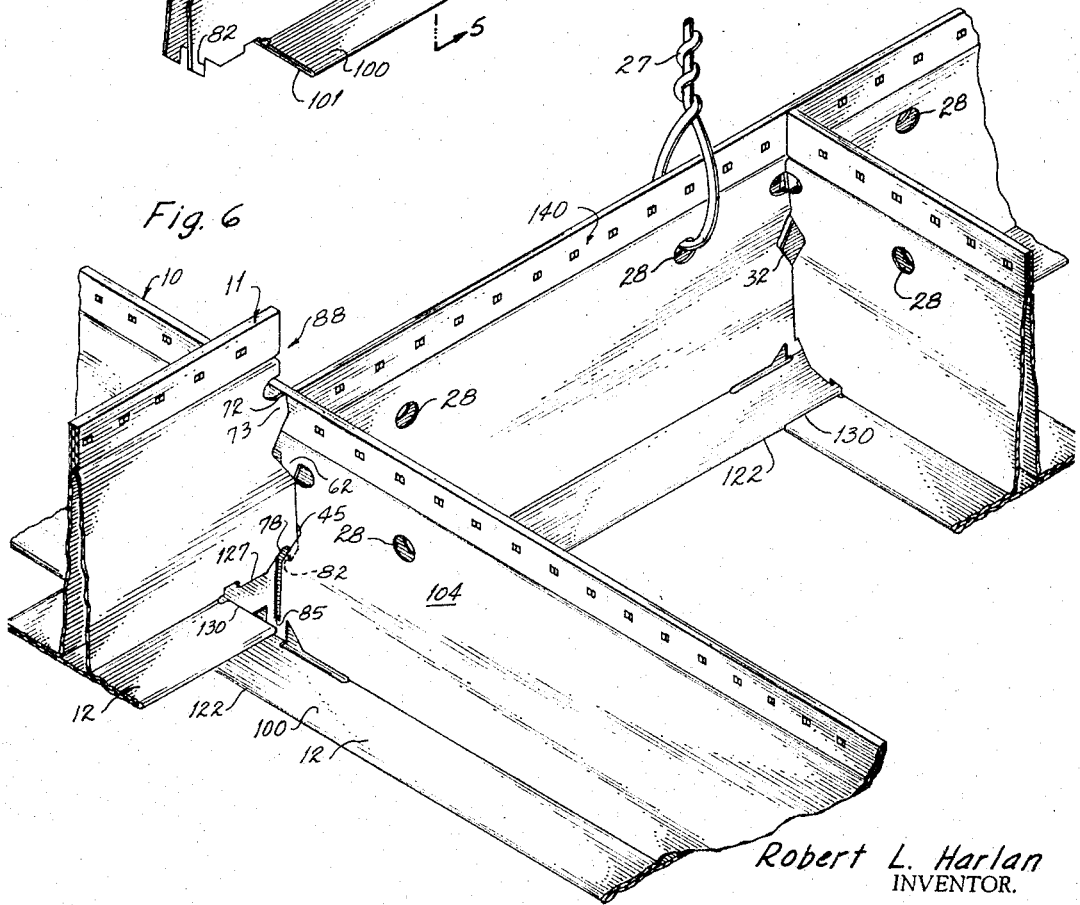

United States Patent Office 3,369,332
Patented Feb. 20, 1968

3,369,332
CEILING SUSPENSION SYSTEM
Robert L. Harlan, Geneva, Ill., assignor to Jim Walter Corporation, Tampa, Fla., a corporation of Florida
Filed Apr. 14, 1966, Ser. No. 542,649
7 Claims. (Cl. 52—98)

This invention pertains to a ceiling suspension system, and more particularly to an exposed ceiling suspension system in which interlocking suspension members are easily assembled to form a rigid grid to support ceiling panels.

In current building construction, ceilings may be suspended from an overhead support which usually is the under side of the floor above the ceiling, or the support for the building roof. In order to support the ceiling in place, a network of suspension members is formed by interlocking such suspension members to form a grid and suspending the grid from an overhead support. The suspension members have horizontally projecting flanges which support acoustical ceiling panels or tiles and light fixtures to form a continuous ceiling.

While various types of suspension members are now available, each type has serious disadvantages; such as, high cost of fabrication, multiple parts which must be assembled together either at the factory or on the job, or difficult and time-consuming methods of assembly must be used. An additional, but not less important, consideration is the necessity of providing a rigid, tightly interlocked system. Unless such a rigid system is provided, the suspension members may not lie in the same plane or may be askew at an unsightly angle away from the horizontal; thus, destroying the aesthetic effect of the ceiling.

Also, since the length of the main members may not span the total length of the ceiling, additional splicing elements are provided in other types of suspension systems. Furthermore, because of separate requirements, the ends of shorter cross-members are different in shape or configuration from the ends of the main suspension members, thus resulting in separate inventory and ordering problems from the manufacturer, dealer and installer.

It is an object of the present invention to provide a novel suspension member and system which overcome the short-comings of the prior art.

It is another object of the present invention to provide novel suspension members which can be fabricated from a continuous ribbon of sheet metal and used without additional parts or components.

It is yet another object of the present invention to provide a novel suspension member which can be interlocked with similar suspension members to form a rigid grid support for ceiling panels or tiles and fixtures.

It is still another object of the present invention to provide a novel suspension member which can be easily connected with other similar members with a minimum of effort.

These and other objects and advantages of the present invention will become more apparent to those skilled in the art from a consideration of the accompanying drawings, in which like numerals indicate like elements and in which:

FIGURE 4 is a perspective view of a selected length of the suspension member of the invention;

FIGURE 6 is a perspective view of a portion of a grid system formed by interlocking pre-cut lengths of the suspension members.

Figure 1:
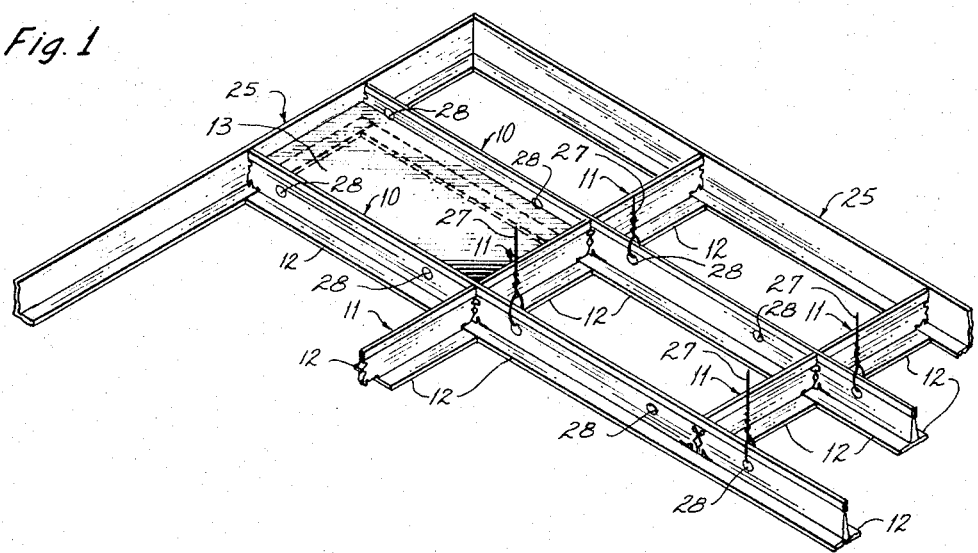
FIGURE 1 is a perspective view of a portion of a ceiling using the suspension members of the invention.

With reference to FIGURE 1, the suspension members 10 and 11 of the present invention are shown as they are assembled in a generally rectangular grid pattern by interlocking various ones of these suspension members. As will become apparent hereinafter, all of the suspension members 10 and 11 are identical in configuration; that is, all members have identically shaped slots between their ends and have identical end configurations. Generally, the suspension members 10 and 11 are cut to uniform lengths in the manufacturing process, but may be easily cut to different lengths subsequent to manufacture so that they are adaptable to various installation situations. In addition, the suspension members 10 and 11 have a uniform distance between the centerlines of the slots; this distance is usually six or twelve inches, as desired. In this manner, acoustical tiles of various dimensions may be selected and used with the grid system for aesthetic effect, as determined by the architect.

For convenience hereinafter, suspension members 10 will be considered main suspension members and suspension members 11 will be considered cross-suspension members. It should be realized that this is an arbitrary designation because of the identical configuration of the members.

Each suspension member 10 and 11 has flanges 12 which form supporting surfaces for acoustical panels 13. The acoustical panels 13 may be conventional sound absorbing panels made from cellulosic or inorganic fibers, usually bonded by a starch, plastic, or resin binder system.

Conventional wall angles 25 may be mounted at the proper height along the boundary walls for supporting the ends of members 10 and edges of ceiling panels adjacent to the wall. Wires 27, attached to the suspension members 10 and 11 through holes 28, are connected to an overhead support (not shown) to suspend the grid system in a horizontal plane. It should be realized that while a specific arrangement of suspension members in a grid are shown, other configurations can be easily assembled.

Figure 2:
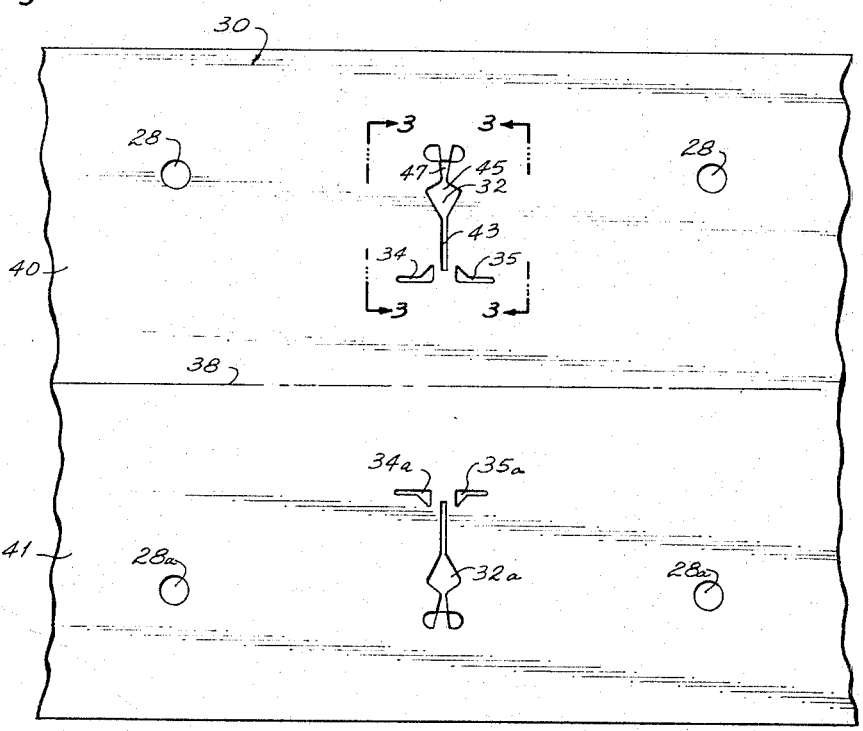
FIGURE 2 is a plan view of a continuous perforated strip of metal showing details of the suspension member of the invention.
Figure 3:
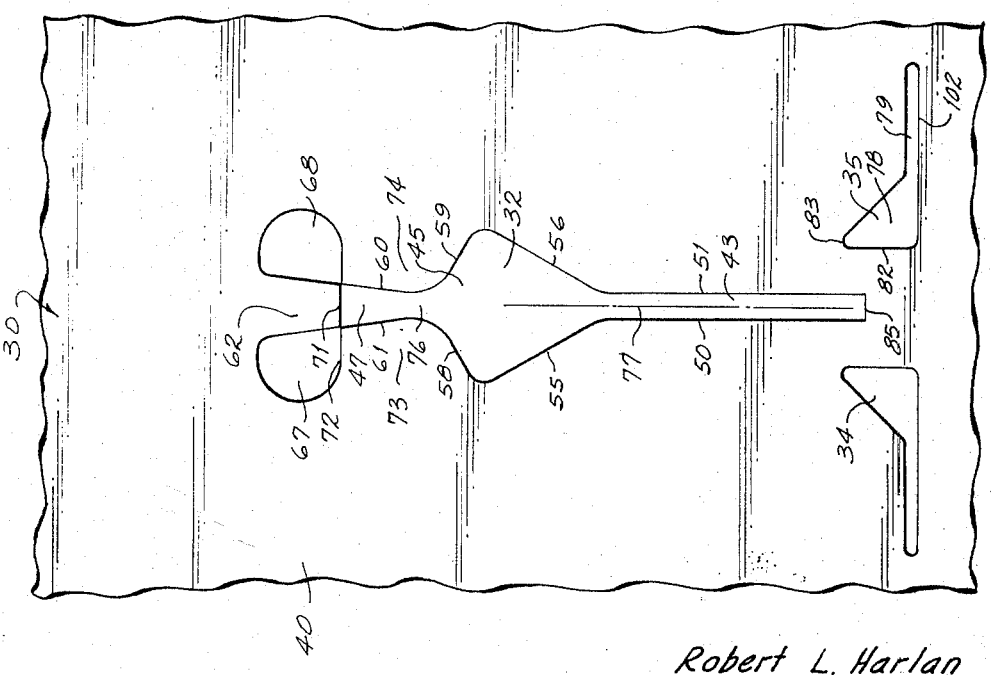
FIGURE 3 is an enlarged plan view of that portion of metal strip of FIGURE 2, which is enclosed between line 3—3.

With reference to FIGURES 2 and 3, continuous strip 30, having a width of about 5 inches and thickness of about 0.020 inch, is perforated with hanger holes 28, main slots 32, and secondary slots 34 and 35. A centerline 38 figuratively divides the metal strip 30 longitudinally and the two portions 40 and 41 of strip 30 on each side of this centerline 38 are mirror images of each other. For this reason the holes and slots in the lower portion 41 (as shown in the drawing) have the suffix "a" after the numbers corresponding to those in upper portion 40 to simplify the description of the invention. Therefore, only portion 40 will be described in detail, portion 41 being understood to be similar thereto.

Wire hanger holes 28 may be drilled or punched conventionally and should be on aligned centers. Neither the size nor spacing of holes 28 is critical except that they are uniform but the holes are placed near slots 32 so as to provide support near the cross-suspension members which may be attached thereat. Holes 28 should be located inwardly from the outer edge of the strip 30 a sufficient amount so that as a bead is formed from these edges, the holes are exposed.

Slot 32 is cut or punched in portion 40 of strip 30 and is formed to have a lower, narrow elongated opening 43, extending in a direction transverse to the longitudinal dimension of strip 30, a second opening 45 above opening 43, and a third opening 47 above opening 45.

The shape of the various openings 43, 45 and 47 of slot 32 is important because it permits the use of a single die operation to form a universal suspension member which can easily be severed to various preselected lengths to form either a main suspension member 10 or a cross-suspension member 11.

More specifically, with reference to FIGURE 3, the lower elongated opening 43 of slot 32 extends downwardly toward flange 12 and terminates a short distance thereabove. Parallel sides 50 and 51 are spaced apart by a distance equal to twice the thickness of the metal strip 30. Above opening 43 is a second opening 45 which is wider, in part, than opening 43 and has inwardly and downwardly sloping sides 55 and 56 which merge with the sides 50 and 51 respectively. The function of inwardly sloping sides 55 and 56 will become apparent when the method of grid assembly is discussed hereinafter.

Opening 45 has upper inwardly sloping sides 58 and 59 which merge with sides 55 and 56 respectively at their lower ends and with sides 60 and 61 of a narrower third opening 47 whose upper end is closed by a tab 62. Tab 62 is made by cutting out lobes 67 and 68 on each side of tab 62. The lower edge 71 of tab 62 is wider than the narrower throat portion 76 of opening 47.

The lower side 72 of cut-out lobe 67 is generally parallel to flange 12 and terminates at the upper extremity of side 61 of opening 47. It should be noted that a tab 73 is formed by sides 58, 61 and 72 of openings 45, 47 and lobe 67, respectively. A similar tab 74 is formed by sides 59, 60 and 75 of openings 45 and 47 and lobe 68, respectively.

Slots 34 and 35 are symmetrically located with respect to the transverse centerline 77 of slot 32. Slots 34 and 35 are similar in configuration and for this reason, only slot 35 will be described.

Slot 35 has a general triangular shaped portion 78, and an elongated portion 79, extending in a direction transverse to central slot 32 and spaced therefrom. A leading edge 82 of slot 35 is parallel to side 51 of opening 43 and terminates at its upper end 83 higher than the lower end 85 of slot 32 so that a portion of edge 82 will engage the web of a main suspension member when a cross-suspension member 11 is in engagement therewith.

Figure 5:
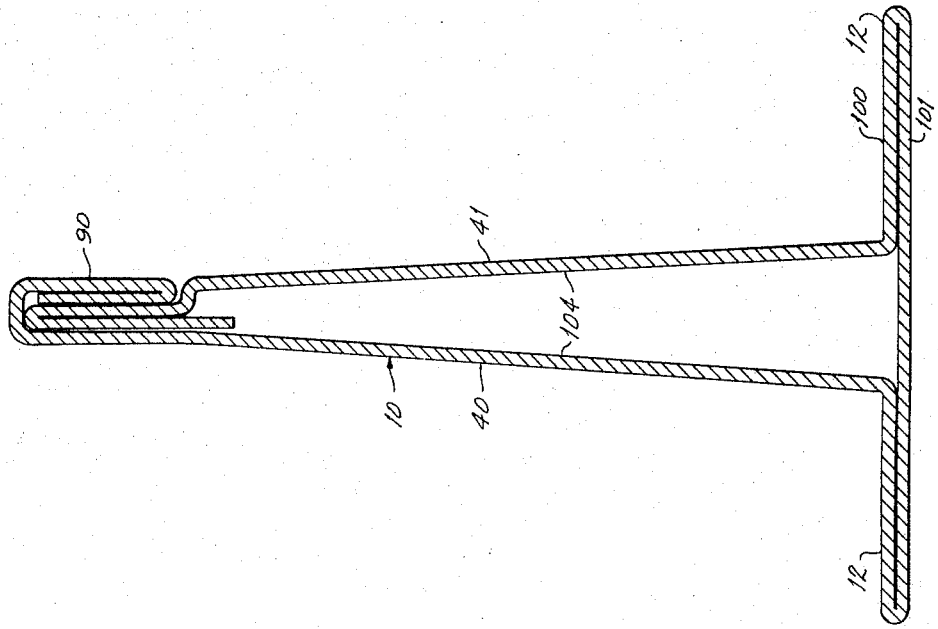
FIGURE 5 is a cross-sectional view of the suspension member of FIGURE 4 taken along line 5—5 of FIGURE 4.

With reference to FIGURES 4 and 5, there is shown a perspective view of a suspension member 10 showing slots 32, 34 and 35 and an end profile 88. Basic metal strip 30 is folded to form a bead 90 along the upper longitudinal edge of the suspension member 10. Strip 30 is further folded so as to form flange 12 having an upper portion 100 and a lower portion 101. The lower edge 102 of slot 35 lies in upper section 100. Flange 12 is formed by folding strip 30 so that the upper and lower sections 100 and 101 respectively form a double thickness. It should be noted that the end configuration 88 is formed by cutting through slot 32 in a manner to be described hereinafter.

As may be more easily seen from the cross-sectional view of FIGURE 5, the upper bead comprises two interlocking longitudinal edges of strip 30. The outer edges of sections 40 and 41 are folded so that the other edge of section 40 encases a folded over outer edge of portion 41. The purpose of the folds in the upper bead 90 is for strength and may take various configurations.

Generally, the suspension member 10 is in the shape of an inverted V with a closure across the open end of the V, formed by portion 101 of flange 12. The upper and lower portions 100 and 101 of flange 12 form a unitary piece with the diverging main sections of double web 104.

Additional strength is imparted to the suspension member 10 by means of the double thickness of the flange 12. In addition, a continuous strip can be used to form the suspension member without adding an additional covering cap member.

In order to cut the members 10 into proper lengths and leave the end configuration such that it forms a locking relation with another suspension member, the members are cut along the dashed lines 108 and 109 in FIGURE 4. At the top, the area 110 is cut out such that its lower end enters lobes 67 and 68 to eliminate tab 62. At the lower end of slot 32, a triangular piece is cut along lines 112 and 113 from sides 50 and 51 of slot 32 into slots 34 and 35 respectively.

At the bottom of member 10, the flange 12 is cut a preset distance on each side away from the centerline 115 which is equidistant from sides 50 and 51 of slot 32. The lines 117, 118, 119 and 120 represent cut lines along which the flange 12 of member 10 should be cut so that member 10 can be produced in preset lengths. The preset distance between lines 117 and 115, and lines 120 and 115 are the same as the length of the outward extent of flange 12 from centerline 38 (FIGURE 5) to the extremity 122 of flange 12.

Reference may be had to FIGURE 6 which shows cross-suspension member 11 after the various cuts have been made to sever the suspension member into two parts with end configuration 88 shown at the left of the figure. The remaining metal forms an extending tab 73 which locks under tab 62 of suspension member 10. At the lower end of the member 11, the edge 82 of slot 35 locks against the inside of sidewall 104 of member 10 and is held in place because leading edge 130 of flange 12 fits tightly against the outer edge 122 of flange 12 of member 10.

Because of the inverted V-shaped cross-section of the suspension member 10, connecting the end of a suspension member 10 to the slot of another suspension member is simplified, because the first suspension member can be brought down directly without tilting either suspension member.

Referring to FIGURE 6, the method of assembly of the grid system is as follows: it will be assumed that suspension member 10 in the foreground has been attached by suitable wirehangers (not shown) to an overhead and that it is desired to connect cross member 11 to member 10. The lower ends of the projecting portion 88 of the web of suspension member 11 are pinched together and the double thickness of web is forced into the portion 45 of slot 32 of member 10. It will be recalled that the width of opening 43 is twice the thickness of the basic strip 32 and thus, the double thickness of the web is held tightly by walls 50 and 51 of opening 43. The downwardly, converging sidewalls 55 and 56 merging with sidewalls 50 and 51 respectively form guides which faciltate entry of cross-member 11 into slot 32 of suspension member 10.

The end 88 of member 11 is then forced downwardly until the lower edge 127 rests on the upper portion 100 of flange 12. At the same time, the hook portion, formed by triangular cut-out 78, locks with side 82 of cut-out 78 being held against the inside of web 104 below the lower edge 85 of slot 32. The leading edge 130 of flange 12 of suspension member 11 locks against the outer edge 122 of flange 12 of member 10. At the same time, the upper edge 72 of tab 73, formed by cutting out lobe 67 and 68, is locked under tab 62. Thus, the combination of the following locking features hold suspension members 10 and 11 tightly in place; (a) locking tab 62 and upper edge 72 of tab 73; (b) the hook formed by cut-out 78 with leading edge 82 being held against the inside of web 104 and leading edge 130 of flange 12 of suspension member 11. and (c) the friction fit of the compressed web sides 104 held between sides 50 and 51 of section 43 of slot 32 of member 10.

In this manner, the interconnected suspension members are held rigidly in place and prevented from either being disengaged or being installed askew. Further, because of the critical dimensions, the flanges of the various suspension members lie in the same place and do not rest upon one another.

It can also be seen from FIGURE 6 that a given suspension member 140 can be extended by attaching suspension member 11 to suspension member 10. At the same time, member 140 maybe interlocked with suspension member 10 at an intermediate slot 32 of member 10. Thus, the ends of each suspension member which are identical to the ends of each of the other suspension members and the intermediate slots are used to lock the ends together.

In summary, the present invention is directed to a novel suspension member which by a unique interlocking feature can be mounted to form a rigid suspension system. The susepnsion system is not only rigid, but the members are held in place so as to avoid an askew condition.

While a particular embodiment of the present invention has been herein shown and described, changes, rearrangements and modifications will occur to those skilled in the art and it is intended to cover such changes, rearrangements and modifications within the scope of the accompanying claims.

I claim:
1. A unitary ceiling suspension member comprising:
   a unitary sheet of material longitudinally folded to form in cross-section a generally inverted V having a reinforcing bead at the apex of the V, outwardly extending flanges at the base of said V and
   planar sidewalls integrally connected to said reinforcing bead along one edge of each of said sidewalls and to said flanges along the opposite edge of each of said sidewalls and diverging in the direction toward said flanges;
   a bottom closure portion connected marginally integrally along said outer edges of said flanges and spanning said divergent sidewalls;
   said sidewalls having slots therein, said slots being uniformly spaced along said sidewalls, said slots having their major axes oriented in a direction transverse to the longitudinal direction of said suspension member, and being so adapted and arranged that end configurations formed by cutting into said slots of one of said suspension members form locking tabs to cooperatively lock with mating portions of slots on another of said suspension members.

2. A unitary ceiling suspension member in accordance with claim 1 in which said sidewalls have slots therein, certain of said slots having a lower elongated opening transverse to the longitudinal direction of said member, said slot having a width equal to twice the thickness of said sheet,
   and in which said sidewalls further have a tab integral therewith and extending centrally of and toward said lower opening of said slot.

3. A unitary ceiling suspension member in accordance with claim 1 in which said slots have a lower elongated opening bounded by parallel edge walls transverse to the longitudinal direction of said member, said parallel edge walls being spaced a distance equal to about twice the thickness of said sheet,
   said slot further having a second opening wider than said lower opening and having inwardly downwardly sloping edge walls merging with said parallel edge walls to guide the end configuration of another suspension member into locking engagement with said unitary ceiling suspension member.

4. A unitary ceiling suspension member in accordance with claim 1 in which said flanges and said bottom closure portion are cut away a distance from and on each side of a centerline through said slot substantially equal to the distance of said flanges from a centerline through the inverted "V" cross-section of said unitary suspension member.

5. A unitary ceiling suspension member in accordance with claim 1 in which said sidewalls have uniformly spaced main slots and pairs of secondary slots,
   each of said pairs of secondary slots being located so that individual ones of said pairs of secondary slots are on opposite sides of and in part below a corresponding one of said main slots,
   each of said main slots being bounded by complementary sidewalls so shaped to form a plurality of interconnected openings,
   a first of said openings being defined by elongated parallel spaced sides transverse to the longitudinal dimension of the web,
   a second one of said openings being wider than said first opening and having inwardly and downwardly sloping sides merging with said elongated sides of said first opening,
   a third one of said openings having a lower throat area merging with upwardly and inwardly sloping sides of said second opening and an upper area,
   said upper area of said third opening being adapted to be closed by a depending tab,
   a tab integral with said web and defined by two lobes, one on each side of said tab, each of said lobes having a flat bottom extending longitudinally of said web to form a locking surface with another of such tabs.

6. A ceiling suspension system in the form of a rectangular grid comprising
   interconnected main suspension members, and cross-suspension members,
   means for suspending said main suspension members in spaced, planar, parallel relationship,
   each of said suspension members comprising a unitary sheet of material longitudinally folded to form in cross-section a generally inverted V, having a reinforcing bead at the apex of the V, outwardly extending flanges at the base of said V and planar sidewalls integrally connected to said reinforcing bead along one edge of each of said sidewalls and to said flanges along the opposite edge of said sidewalls and diverging in the direction toward said flanges;
   said sidewalls of said main susepnsion members having slots therein, said slots having an opening with a width of about twice the thickness of said sheet and a locking tab straddling the upper end of said opening,
   and said cross-suspension members having end configurations formed by cutting portions of certain of said main suspension members, said end configurations being such as to lock said main and cross-suspension systems in a rigid grid.

7. A ceiling suspension system in accordance with claim 6 in which said opening has upper divergent sidewalls at the end thereof facing said locking tabs to provide guide means for aiding in the insertion of said cross-suspension member into said main suspension member.

References Cited

FOREIGN PATENTS 1,102,109     1954    France.
620,469     1961    Canada.

JOHN E. MURTAGH, *Primary Examiner.*